United States Patent
Braun et al.

(10) Patent No.: US 6,527,135 B1
(45) Date of Patent: Mar. 4, 2003

(54) WATER RESISTANT WALL MOUNT ENCLOSURE WITH PIVOTING REMOVABLE COVER

(75) Inventors: Willie Braun, Franklin Lake, NY (US);
Albert Pedoeem, West Orange, NJ (US); Kan Liu, New York, NY (US);
Mike Buchinger, Piermont, NY (US);
John McKeen, New City, NY (US);
John Pikramenos, Astoria, NY (US)

(73) Assignee: Fujitsu Network Communications, Inc., Richardson, TX (US)

( * ) Notice: Subject to any disclaimer, the term of this patent is extended or adjusted under 35 U.S.C. 154(b) by 283 days.

(21) Appl. No.: 09/692,302

(22) Filed: Oct. 19, 2000

(51) Int. Cl.[7] ................................................ H02G 3/00
(52) U.S. Cl. ...................... 220/4.02; 220/3.8; 220/3.94
(58) Field of Search ................................ 220/4.02, 3.3, 220/3.8, 3.9, 3.94

(56) References Cited

U.S. PATENT DOCUMENTS

| | | | | |
|---|---|---|---|---|
| 4,791,244 A | * | 12/1988 | Taybl ........................ 220/3.8 X |
| 5,011,033 A | * | 4/1991 | Roth .......................... 220/3.94 |
| 5,228,584 A | * | 7/1993 | Williams, Jr. ............. 220/3.3 X |
| 5,621,387 A | * | 4/1997 | Phillips et al. ........... 220/3.8 X |
| 5,864,091 A | * | 1/1999 | Sumida ................... 220/4.02 X |
| 5,914,460 A | * | 6/1999 | Mowery et al. ........ 220/3.94 X |
| 6,145,683 A | * | 11/2000 | Taniguchi .................. 220/4.02 |

* cited by examiner

Primary Examiner—Steven Pollard
(74) Attorney, Agent, or Firm—Weingarten, Schurgin, Gagnebin & Lebovici LLP

(57) ABSTRACT

A water resistant enclosure providing protection to electrical or electronic equipment contained therein includes a three-sided removable cover pivotally coupled to a wall mounting bracket that includes a back panel-base plate combination. The three-sided removable cover further includes an enclosure door that covers the front opening. The three-sided removable cover also includes features to provide for water resistance. These features include an overhang extension from the top side wall of the three-sided removable cover extending to partially cover the front opening and in particular to cover the seam created between the enclosure door and the removable cover, and a gutter surrounding the front opening to divert water therefrom. In addition, the three-sided removable cover and the wall mounting bracket include elements to provide for the proper alignment and orientation thereof when being mated together. In addition, the pivot member and pivot member receiver are attached to the interior of the top side and wall mounting bracket respectively such that the water resistance of the respective surfaces is not compromised.

20 Claims, 6 Drawing Sheets

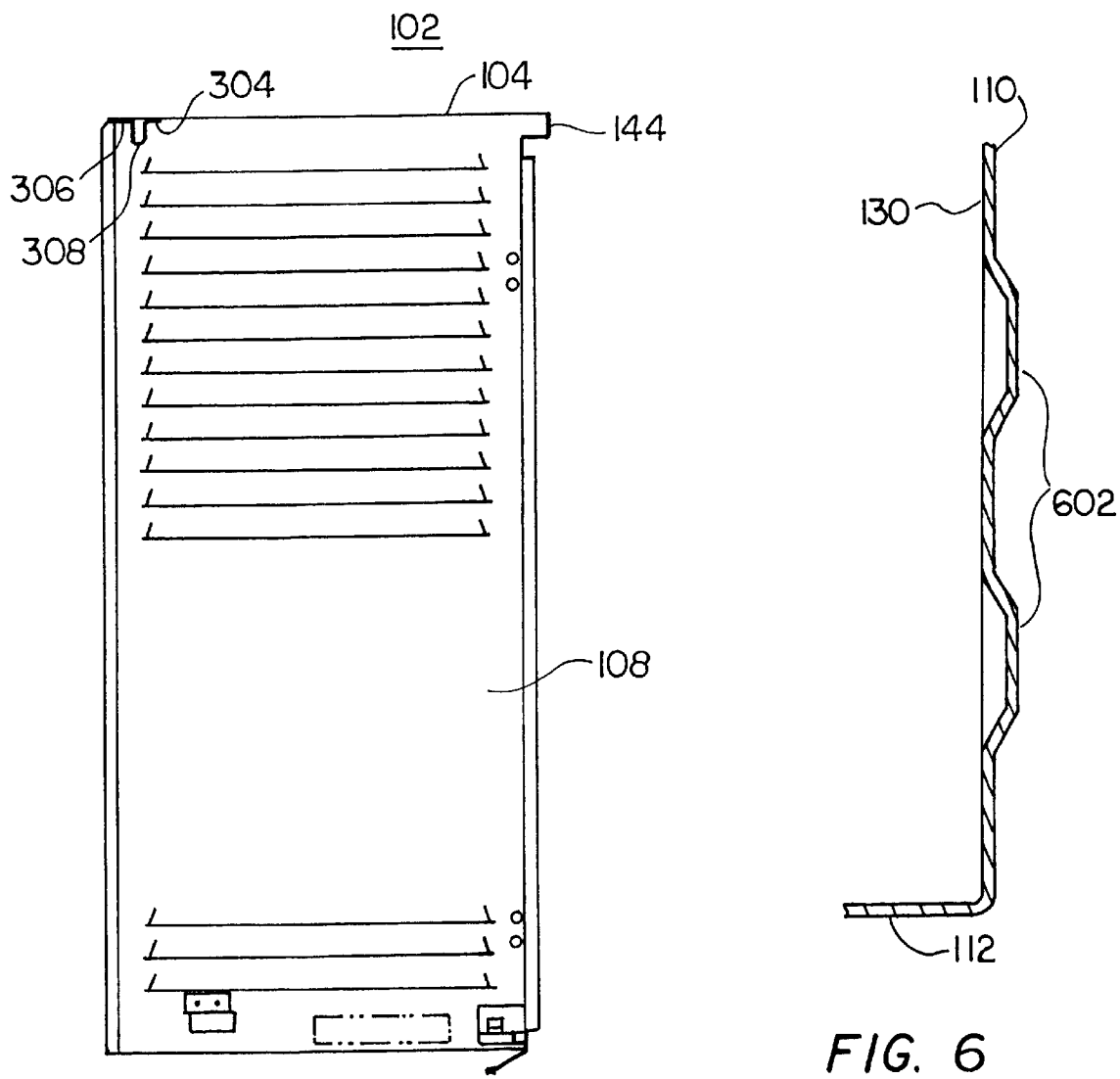
FIG. 4
FIG. 6
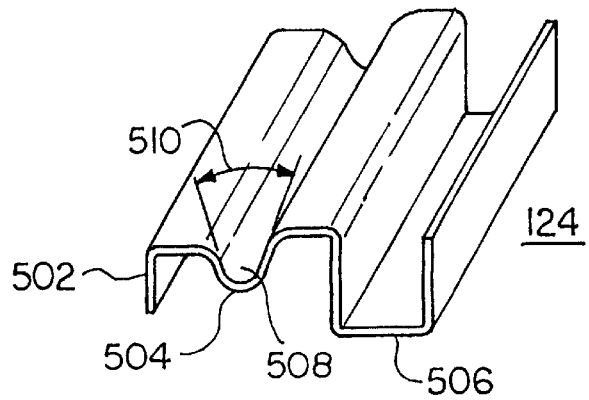
FIG. 5

WATER RESISTANT WALL MOUNT ENCLOSURE WITH PIVOTING REMOVABLE COVER

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

This invention relates generally to the field of wall mounted enclosures for electronic equipment and in particular to wall mounted water resistant enclosures for electronic equipment.

Enclosures for mounting electrical equipment such as computer network interfaces, telecommunications equipment, junction boxes, and connector panels are often mounted in racks or secured to a wall to provide the necessary physical stability and to maximize the use of the available space. Although these enclosures may be deployed indoors, the enclosures nonetheless must be water resistant to protect the electronic equipment from potential hazards, such as a leak in a water pipe, a leak in a roof or broken window allowing water to enter the building, or the activation of a fire suppression water sprinkler system. Equipment in wall mounted enclosures may be more susceptible to water damage than rack mounted equipment because one side of the enclosure is secured to the wall and may prevent water from flowing off the top of enclosure in a controlled manner.

Prior art wall mounted enclosures have used various methods to provide water resistance to the enclosures. In the past, clips have been used to secure the cover over and around the electronic equipment and to allow for easy removal of the cover for servicing of the equipment contained inside. Clips, however, have several difficulties. For example, in many instances, the clips may be secured when the cover is not properly aligned or oriented. This can lead to open seams occurring between the cover and mounting brackets that can allow water to enter the enclosure. It can be difficult to provide an alignment mechanism to ensure that the cover is secured properly when using a clip system. This lack of an alignment mechanism contributes to making the installation of the enclosure that much more difficult and less secure.

In addition, the enclosure may flex and bend during the cover installation and removal processes. This flexing and bending of the cover may increase the likelihood that the enclosure is not installed incorrectly. Thus, stiffening of the enclosure may be needed to provide the structural stability necessary to allow for the proper manual alignment of the cover during the cover installation and removal processes. This stiffening, however, adds to the physical dimensions of the enclosure increasing its weight and cost, and making it more difficult use.

It would therefore be desirable to provide an enclosure that is water resistant and that can be installed and removed with proper alignment and orientation of the cover in a simple and reliable manner.

BRIEF SUMMARY OF THE INVENTION

In accordance with the present invention an improved water resistant enclosure is provided that includes a three-sided removable cover that is pivotally attached to an L-shaped wall mounting bracket. The wall mounting bracket is rigidly attached to a wall surface. The water resistant enclosure further includes an enclosure door attached to a front opening of the water resistant enclosure to completely enclose any electronic equipment contained within the enclosure. A pivot member is rigidly attached to the interior side of a top side of the three-sided removable cover and a pivot member receiver is rigidly attached to the interior of the back panel. The pivot member and the pivot member receiver are configured and arranged such that the three-sided removable cover can be pivoted and removed without damaging the enclosure, the wall mounting bracket, or the wall. Moreover, there is no seam or other opening in the top cover through which water can intrude into the enclosure.

The three-sided removable cover and wall mounting bracket also include a self alignment mechanism that ensures that the three-sided removable cover is properly aligned and oriented in order to mate properly with the wall mounting bracket and thereby ensure that the enclosure is water resistant. In addition, an overhang extending from the top side wall covers the front opening and the seam created between the enclosure door and the cover, and a gutter surrounds the front opening, to divert water away from the front opening. In another aspect of the present invention, two pairs of complementary shaped hooks are rigidly attached to the interior of the two side walls and to the base plate of the wall mounting bracket. When properly aligned and oriented, the complementary shaped hooks are coupled together and prevent vertical motion of the enclosure with respect to the wall mounting bracket.

Other features, functions, and aspects of the backplane and shelf arrangement will be evident from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the drawings of which:

FIG. 4 is a side cross sectional view of the inside of a cover used in the enclosure of FIG. 1 showing the attachment of the pivot member in FIG. 3;

FIG. 5 is a perspective view of a pivot member receiver for the water resistant enclosure of FIG. 1;

FIG. 6 is a side view of a back panel used with the water resistant enclosure of FIG. 1;

DETAILED DESCRIPTION OF THE INVENTION

Figure 1:
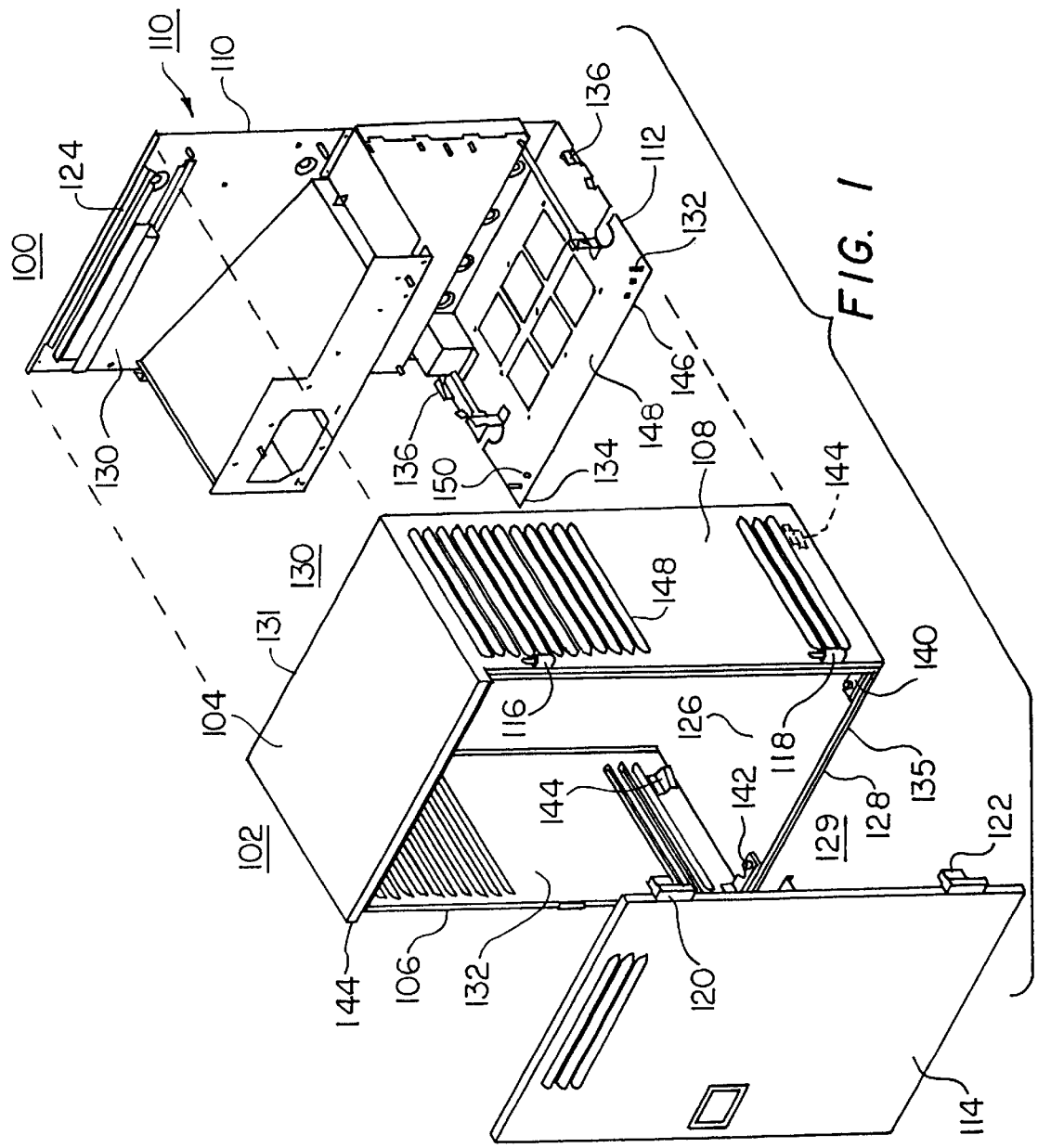
FIG. 1 is an exploded view of a water resistant enclosure consistent with the present invention.

FIG. 1 illustrates a wall mounted water resistant enclosure 100 that includes a wall mounting bracket 109, a three-sided removable cover 102, and an enclosure door 114. The three-sided removable cover 102 comprises a top side wall 104 that is rigidly attached to a first side wall 106 and a second side wall 108. The removable cover 102 defines an interior 126, a front portion 129, a rear portion 130, a front opening 132, and a rear opening 131. The mounting bracket 109 includes a back panel 110 that has a plurality of bosses (not shown) thereon. As will be explained in more detail below, the bosses provide a space between the back panel 110 and the wall to provide a path for water. The wall mounting bracket 109 further includes a base 112 rigidly attached to the back panel 110. The wall mounting bracket 109 is rigidly attached to a wall by any suitable method that will provide the necessary physical stability and security. The removable cover 102 is pivotally attached to the wall mounting bracket 109 via a pivot member (not shown) that is seated in a pivot member receiver 124 that is rigidly attached to the interior surface of the back panel 110. When the removable cover 102 is properly aligned and oriented and is pivotally attached to the back panel 110 of the wall mounting bracket 109, the combination of the removable cover 102 and the wall mounting bracket 109 form a water resistant five sided cover in which the L-shaped wall mounting bracket 109 covers the rear opening 131 and the bottom opening 135.

Enclosure 100 further includes an enclosure door 114 attached to the removable cover 102 by a pair of hinges consisting of members 116 and 118 and members 120 and 122. When closed, the enclosure door 114 covers the front opening 133 and creates a seam between the enclosure door 114 and the cover 102. In addition, the enclosure door 114 provides water resistance and physical security for the electrical equipment contained within the enclosure 100. Louvers 148 in the first and second side walls 106 and 108 as well as the enclosure door 114 provide for ventilation of equipment contained within the enclosure.

As used herein, a surface is considered to be water resistant if it is substantially flat, and also free of openings or seams through which water may enter the enclosure. In addition, a surface may be substantially water resistant if any openings or seams in the surface are protected such that water flowing in a preferred direction is directed around, or deflected from, any openings in that surface.

The removable cover 102 may be constructed from one or more formed pieces of sheet metal. In the event that two or more pieces of sheet metal are employed, the pieces are preferably connected in a manner that avoids open seams that could permit moisture to enter the enclosure 100. In a preferred embodiment spot welding may be used to connect the sheet metal pieces together.

Figure 2:
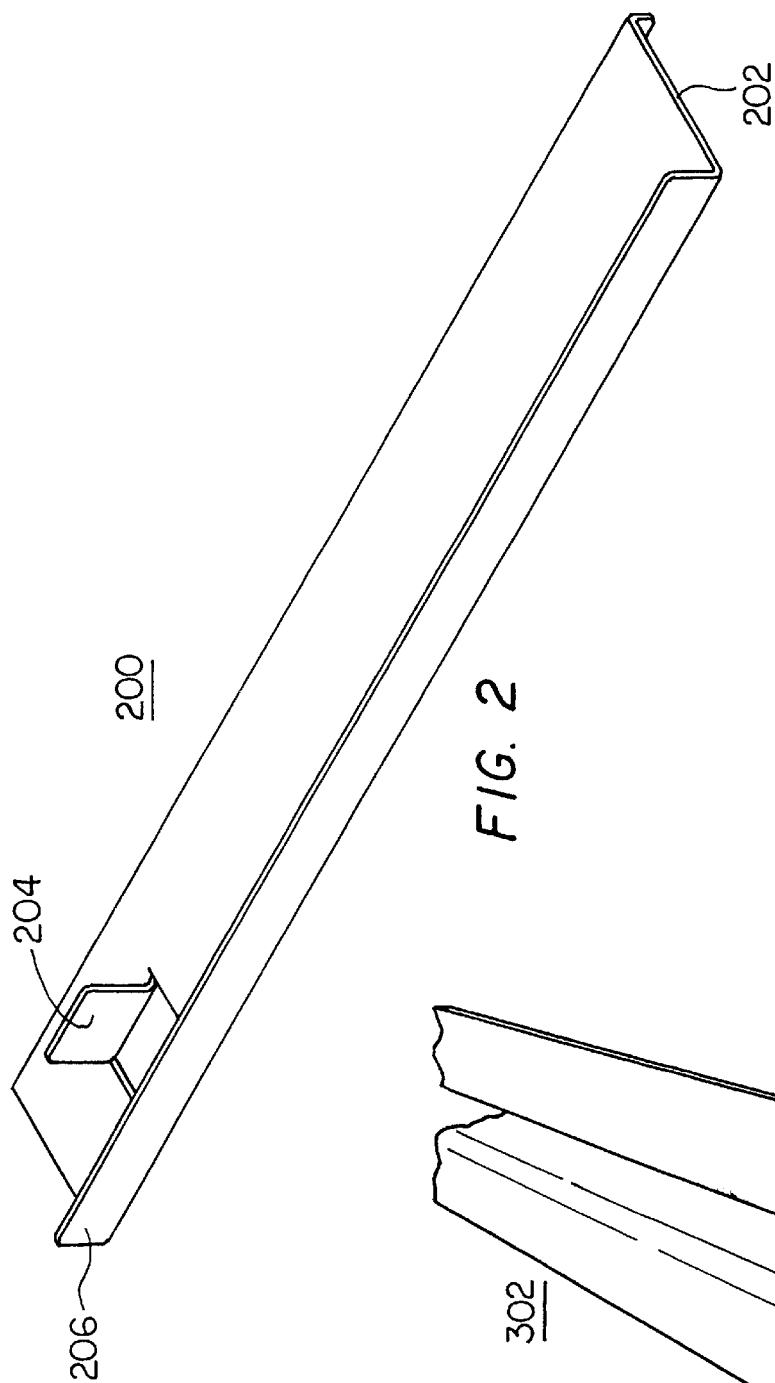
FIG. 2 is perspective view of a door stiffener used in the water resistant enclosure of FIG. 1.

To prevent the door 114 from bending or twisting during opening and closing, a stiffener member is disposed across the interior of the door in an orientation selected to achieve the desired stiffness. In a preferred embodiment, the door stiffener may be placed horizontally across the interior of the door 114. FIG. 2 illustrates one embodiment of a suitable stiffener 200 that includes an attachment portion 206, a horizontal portion 202 and a tab 204. The stiffener member 200 is rigidly attached on the interior side of the enclosure door 114 preferably by spot welding the attachment portion 206 to the interior side. The tab 204 may be used to contact a safety switch within the enclosure (not shown) to ensure that electrical power is turned off when the door is opened.

Figure 3:
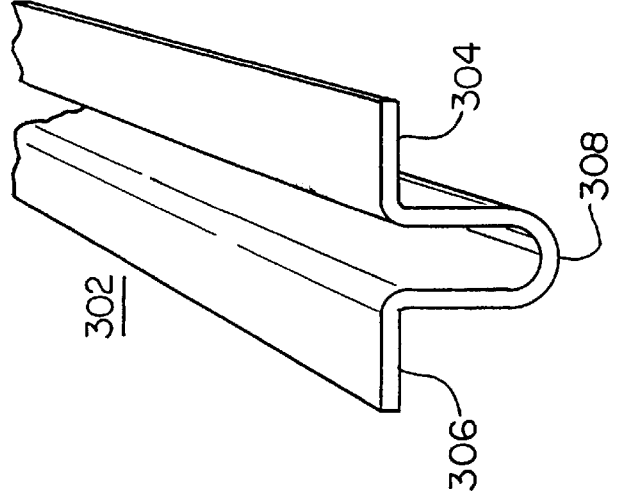
FIG. 3 is a perspective view of a pivot member used with the water resistant enclosure of FIG. 1.

FIG. 3 illustrates a pivot member 302 used in the water resistant enclosure 100. The pivot member 302 includes a first attachment portion 304, a second attachment portion 306 and a U-shaped pivot portion 308. It is important that the exterior surface of the top side wall 104 be smooth and unbroken to prevent water from entering the enclosure 100 via the top side wall 104. As illustrated in FIG. 4, the pivot member 302 is rigidly attached to the interior side of the top side wall 104, preferably by spot welding. The pivot member 302 is attached near to, but spaced apart from, the rear opening 131 of the removable cover 102. This spaced apart configuration allows the removable cover 102 to be pivoted and removed from the wall mounting bracket 109 without any damage to the enclosure 102, the wall mounting bracket 109 or the wall to which the back panel is attached.

FIG. 5 illustrates the pivot member receiver 124 attached to the back panel 110. The pivot member receiver 124 includes a first attachment portion 502 that is used to rigidly attach the pivot member receiver 124 to the back panel 110. The pivot member receiver 124 further includes a V-shaped pivot receiver portion having a rounded vertex 504 that receives the pivot member 302 (FIG. 3). The V-shaped receiver 504 may include an opening 508 that subtends an acute angle 510. In a preferred embodiment, the acute angle 510 is between 30 and 50 degrees, and preferably is 40 degrees. The pivot member receiver 124 is configured and arranged such that the pivot member recover 124 and the pivot member 302 are able to mate together to form a pivotable hinge. A cable tray 506 may be provided to enable the routing of electrical conductors above the electrical equipment contained within the enclosure 100.

FIG. 6 illustrates one embodiment of the back panel 110 that contributes to the improved water resistance of water resistant enclosure 100. The back panel 110 includes a plurality of bosses 602 formed on its exterior side. These bosses 602 separate the back panel 110 from the wall to which it is attached. These bosses 602 are configured and arranged to provide a path between the wall and the back panel 110 to permit water to run down the exterior of the back panel 100. This would allow the water to flow between the back panel 110 and the wall, preventing water from pooling on the exterior surface of the top side of the cover. This pooling of water may allow water to cascade in an uncontrolled manner over unsealed seams between the cover 102 and wall mounting bracket 109, or over the enclosure door 114. These seams and surfaces may be less water resistant than the back panel 110 of the wall mounting bracket 109.

Figure 7:
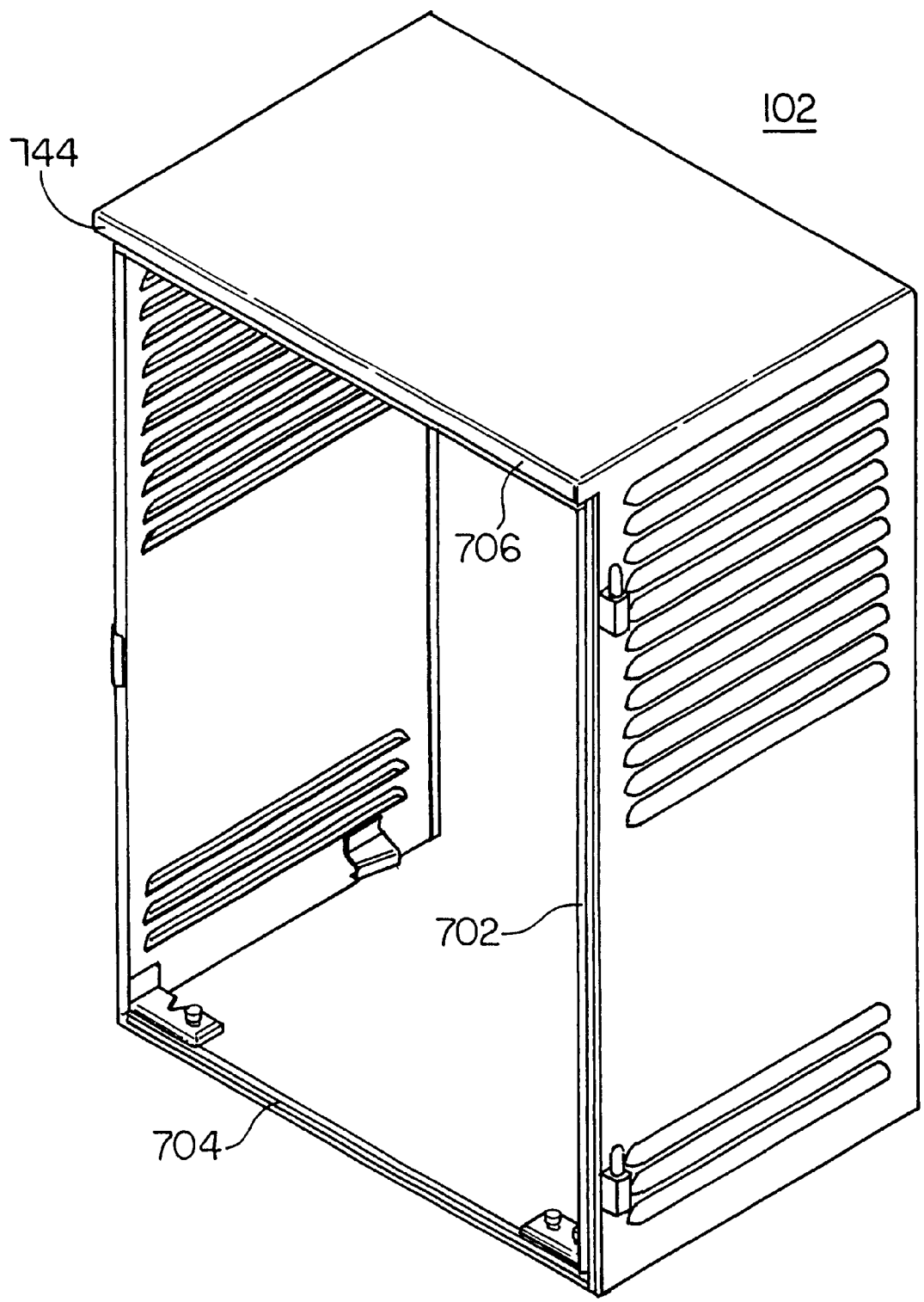
FIG. 7 is a perspective view of the exterior of the three-sided removable cover of FIG. 4.
Figure 9:
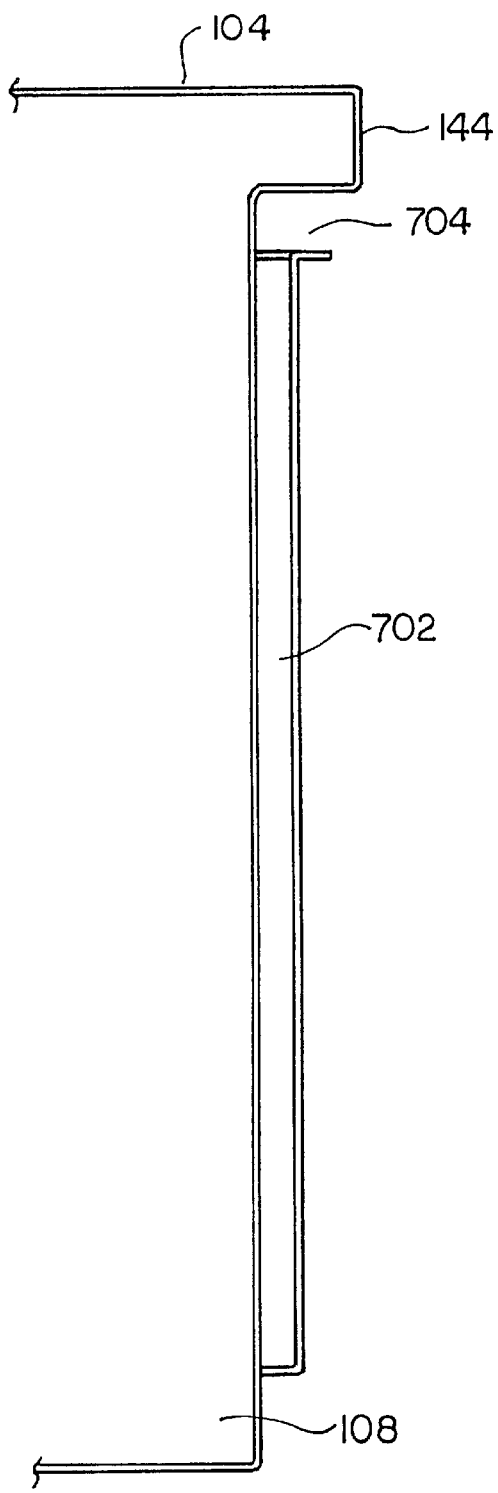
FIG. 9 is a side view of the water resistant enclosure of FIG. 1 showing the gutter surrounding the door.

FIGS. 1, 7 and 9 illustrate another aspect of the water resistant enclosure 100 that contributes to water resistance. Overhang 144 extends from the top side wall 104 of the cover 102 over the front opening 133 and in so 9 particular the seam created between the enclosure door 114 and the cover 102. The overhang 144 diverts water away from the front opening 133 and the seam between the enclosure door 114 and the cover 102 so that water is prevented from entering the enclosure 100 via the unsealed seam. In addition, a channel 704 in the top side 104, a channel 702 in the second side wall 108, and a channel in the first side wall (not shown) are in fluid communication with one another to form a continuous gutter that surrounds the front opening 133 on three sides. This allows water that collects around the front opening and the enclosure door 114 to flow away from the front opening the enclosure door 114, and off the water resistant enclosure without entering therein.

Figure 8:
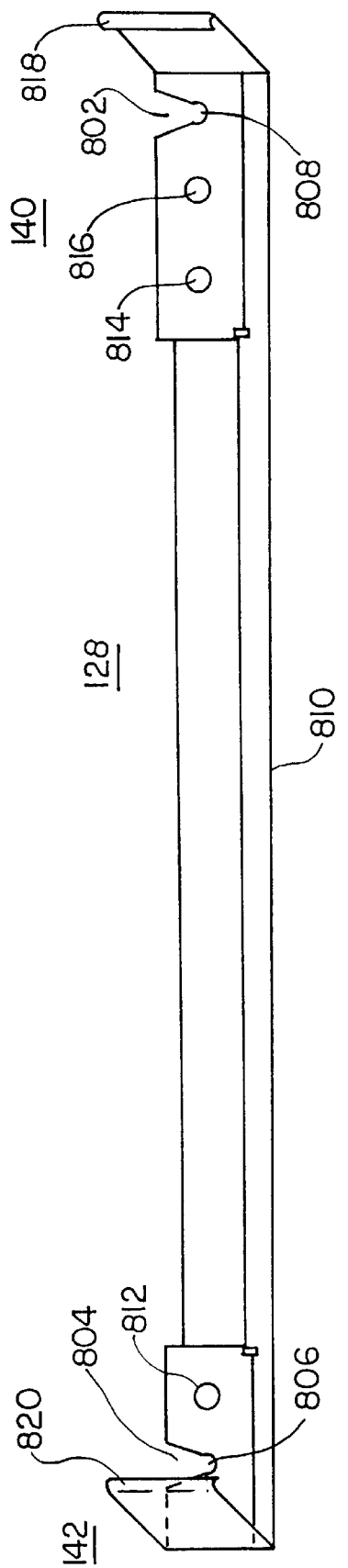
FIG. 8 is a top view of a self-alignment receiver used with the water resistant enclosure of FIG. 1.

FIGS. 1 and 8 illustrate a self-alignment member 128 used to ensure the proper alignment and orientation of the removable cover 102 and the wall mounting bracket 109 when the two are pivotally attached to one another. The self alignment member 128 includes at least two self-alignment receivers 140 and 142. The self-alignment receivers 140 and 142 include respectively a V-shaped capture area 802 and 804 and a seat area 808 and 806. The self-alignment member 128 is a front rib rigidly attached via captive screws 812 and 814 to the base plate 112 via holes 150 and 146. In one embodiment, another screw 816 may be used to provide a suitable secure ground contact and a more rigid attachment via hole 148. The self-alignment member 128 is oriented such that the V-shaped capture areas 802 and 804 are facing the rear area 130 of the enclosure 100. Self alignment posts 132 and 134 are rigidly attached to the base plate 112 and are configured and arranged such that as the removable cover 102 is pivoted from an open position to a mated position, the self-alignment posts are captured by capture areas 802 and 804. The V-shaped capture areas 802 and 804 guide a vertical edge element of the front facing edge of the self-alignment posts 132 and 134 to the seat area 808 and 806. When coupled together, the self alignment member 128 and self-alignment posts 123 and 134 provide for the correct alignment and orientation of the removable cover 102 with respect to the wall mounting bracket 109. This ensures that the alignment and orientation of the removable cover 102 and the wall mounting bracket 109 is correct in order to provide desired water resistance.

Figure 10:
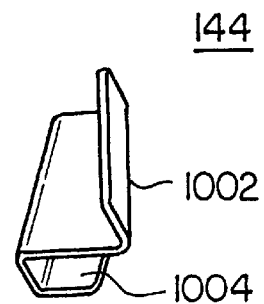
FIG. 10 is a perspective view of a first hook used with the water resistant enclosure of FIG. 1.
Figure 11:
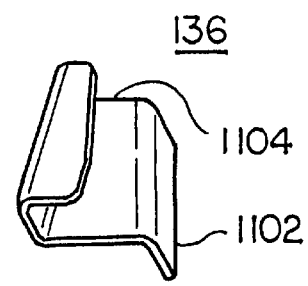
FIG. 11 is a perspective view of a second hook used with the water resistant enclosure of FIG. 1.

In order to prevent movement of the removable cover 102 relative to the wall mounting bracket 109 two pair of complementary shaped hooks are provided as illustrated in FIGS. 1, 10 and 11. A pair of U-shaped hooks 144 are rigidly attached to the interior surface of the side walls 106 and 108 of the cover 102 via attachment surface 1002, preferably by spot welding. The U-shaped portion 1004 faces the interior of the enclosure 100.

A pair of complementary shaped hooks 138 are rigidly attached to the base plate 112 by tab 1102, preferably as a cut-out formed from the material of the base plate 112. The U-shaped portion 1104 faces the interior of the enclosure 100. The complementary pairs of hooks are configured and arranged to interlock the respective U-shaped portions 1004 and 1104 to couple the respective pairs of complementary U-shaped hooks together when the cover 102 has been pivoted to a closed position. This coupling prevents vertical movement of the three-sided removable cover 102 relative to the base plate 112. In addition, the two pairs of complementary shaped hooks also contribute to the proper alignment and orientation of the removable cover 102 when mated to the wall mounting bracket 109. The coupling of the pairs of complementary hooks can be accomplished only if the removable cover 102 is properly aligned and oriented with the wall mounting plate 109. Thus, proper alignment of the removable cover 102 with the wall mounting plate 109 is indicated if the removable cover 102 cannot be moved in the vertical direction 146.

Those skilled in the art should further appreciate that variations to and modification of the above-described water resistant enclosure may be made without departing from the inventive concepts disclosed herein. Accordingly, the invention should be viewed as limited solely by the scope spirit of the appended claims.

What is claimed is:

1. A water resistant enclosure for mounting to a wall comprising:

a wall mounting bracket including a back panel to be rigidly secured to said wall, wherein said wall mounting bracket has an interior side and an exterior side a three-sided removable cover having a top side, and first and second side walls, said three-sided removable cover having an interior, an exterior, a front opening and back openings defined by said top side and said first and second side walls, said exterior of said top side extending beyond said front opening, said exterior of said top side being substantially water resistant, and said removable cover being pivotally attached to said wall mounting bracket;

said pivotal attachment including a pivot member rigidly attached to said interior of said top side proximate to said back of said three-sided removable cover and further including a pivot member receiver,; rigidly attached to said interior side of said wall mounting bracket and being configured and arranged to receive said pivot member.

2. The water resistant enclosure of claim 1 wherein said pivot member is substantially U-shaped.

3. The water resistant enclosure of claim 1 wherein said pivot member receiver is V-shaped having a rounded vertex.

4. The water resistant enclosure of claim 3 wherein said pivot member receiver has an opening that subtends an acute angle.

5. The water resistant enclosure of claim 4 wherein said acute angle is between 30 and 50 degrees.

6. The water resistant enclosure of claim 5 wherein the acute angle is 40 degrees.

7. The water resistant enclosure of claim 1 wherein said pivot member is rigidly attached by welding.

8. The water resistant enclosure of claim 1 wherein said pivot member receiver is rigidly attached to said wall mounting bracket by welding.

9. The water resistant enclosure of claim 1 wherein said wall mounting bracket includes a plurality of bosses on said exterior surface to provide a spaced apart relationship between portions of said wall mounting bracket and said wall, such that there is a fluid pathway from the top of said wall mounting bracket to said bottom of said wall mounting bracket.

10. A water resistant enclosure comprising:

a wall mounting bracket including a back panel, wherein said wall mounting bracket has an interior side and an exterior side a three-sided removable cover having a top side, and first and second side walls, said three-sided removable cover having an interior, an exterior, a front opening and back openings defined by said top side and said first and second side walls, said exterior of said top side extending beyond said front opening, said exterior of said top side being substantially water resistant, and said removable cover being pivotally mounted to said wall mounting bracket;

said removable cover further including a front rib rigidly attached to said first and second side walls on said front of said three-sided removable cover opposite from said top side;

said exterior surface of said wall mounting bracket having a plurality of bosses to provide a spaced apart relationship between portions of said wall mounting bracket and said wall, such that, there is a fluid pathway from the top of said wall mounting bracket to said bottom of said wall mounting bracket;

an enclosure door attached to said removable cover;

said overhanging portion extending from said exterior of said top side over said front opening and said enclosure door;

each of said front of said top side wall, first side wall, and second side wall having a first, second, and third respectively formed therein, said first, second, and third, channels being in fluid communication and forming a continuous gutter surrounding said front opening on three sides.

11. A water resistant enclosure comprising:
a three-sided removable cover comprising a top side rigidly attached to first and second side walls, said three-sided removable cover further including a front rib rigidly attached to said first and second side walls on said front of said three-sided removable cover opposite from said top side wall, said removable cover having an interior, an exterior, said removable cover having a front and a back, and said front of said top side wall first side wall, second side wall, and front rib defining a front opening;
a wall mounting bracket that includes a back panel, said three-sided removable cover being pivotally attached at said rear of said removable cover to said back panel, and further including a base plate rigidly attached to said back panel, wherein said back panel has a interior side and an exterior side and wherein said three-sided removable cover and said back panel and said base plate form a five-sided enclosure;
at least first and second self-alignment elements rigidly attached to said base plate;
at least third and fourth self-alignment elements rigidly attached to said front rib and being configured and arranged to couple with said at least first and second self-alignment elements to provide the proper alignment and orientation of said three-sided removable cover and said back plane and base plate.

12. The water resistant enclosure of claim 11 wherein said at least first and second self-alignment elements are alignment posts having a forward face having an edge element.

13. The water resistant enclosure of claim 12 wherein said at least third and fourth self-alignment elements include a capture portion and a seat portion.

14. The water resistant enclosure of claim 13 wherein said capture portion is V-shaped.

15. The water resistant enclosure of claim 14 wherein said seat portion is configured and arranged to securely receive said edge element of said alignment post.

16. The water resistant enclosure of claim 12 wherein said at least third and fourth self-alignment elements are alignment posts having a forward face having an edge element.

17. The water resistant enclosure of claim 11 wherein said at least first and second self-alignment elements include a capture portion and a seat portion.

18. The water resistant enclosure of claim 17 wherein said capture portion is V-shaped.

19. The water resistant enclosure of claim 17 wherein said seat portion is configured and arranged to securely receive said forward face of said alignment post.

20. The water resistant enclosure of claim 11 further including first and second U-shaped hooks rigidly attached to said interior of said first and second side walls respectively, and third and fourth hooks having a complementary shape of said first and second U-shaped hooks respectively, said third and fourth hooks being rigidly attached to said base plate, said third and fourth hooks being configured and arranged to couple with said first and second hooks respectively and operative to prevent movement of said three-sided removable cover relative to said back panel and said base plate.

* * * * *

UNITED STATES PATENT AND TRADEMARK OFFICE
CERTIFICATE OF CORRECTION

PATENT NO.       : 6,527,135 B1
DATED            : March 4, 2003
INVENTOR(S)      : Willie Braun et al.

It is certified that error appears in the above-identified patent and that said Letters Patent is hereby corrected as shown below:

<u>Title page,</u>
Item [75], Inventors, "Franklin Lake, NY" should read -- Franklin Lakes, NJ --;
insert the following inventor, -- Carl Fattal, Pomona, NY --; and <u>Column 4,</u>
Line 49, "and in so 9 particular" should read -- and in particular --.

Signed and Sealed this

Twenty-ninth Day of June, 2004

JON W. DUDAS
*Acting Director of the United States Patent and Trademark Office*